United States Patent Office

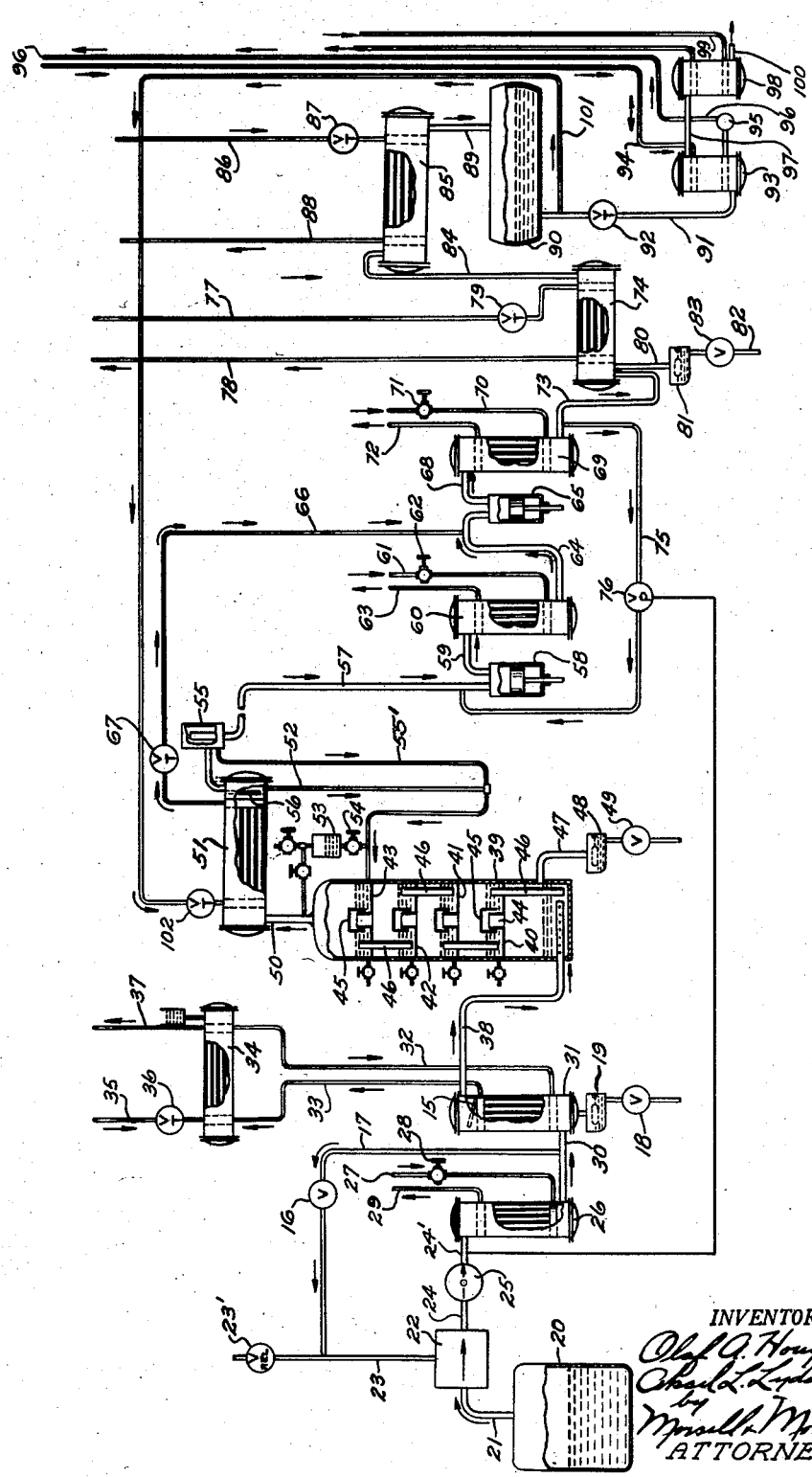

2,862,819
Patented Dec. 2, 1958

2,862,819

APPARATUS FOR AND METHOD OF REMOVING IMPURITIES FROM HIGHLY VOLATILE GAS

Olaf A. Hougen, Madison, Wis., and Aksel L. Lydersen, Trondheim, Norway, assignors to Miller Brewing Company, Milwaukee, Wis., a corporation of Wisconsin Application August 5, 1954, Serial No. 448,074

10 Claims. (Cl. 99—49)

This invention relates to improvements in apparatus for and method of removing impurities from a highly volatile gas such as carbon dioxide gas.

In the manufacture of beer, at a certain stage of the fermenting process, carbon dioxide gas is given off. In most modern breweries this gas is recovered, stored in liquid form and then returned to gaseous form for injection into the beer near the end of the brewing process.

The $CO_2$ gas which is recovered from the fermentation tanks contains water and alcohol vapors, and a number of impurities including amyl alcohol, hop resins, and traces of aldehydes and esters. Some of these impurities are altered upon storage, heating, or chemical treatment to objectionable components which are not removed from the $CO_2$ gas when it is put back into the beer, thus the flavor and other desirable characteristics of the beer are detrimentally affected.

At the present time a number of different systems are used to attempt to remove some of these impurities. However, the best system now employed causes objectionable alteration of the alcohol and impurities with less than half removal of the undesirable components. The systems now used include removal of the impurities by absorption, removal of the impurities by adsorption, and alteration of the impurities by partial oxidation without complete removal.

Persent methods for renewal involve use of solid absorbents, water scrubbers, aqueous solutions of oxidizing agents and various combinations thereof. Some systems employ potassium permanganate to remove impurities. Other systems bubble the gas though water.

In addition to the incomplete removal of impurities which are removed by present processes there are other objections. Where potassium permangante solutions are employed, the treatment is of questionable value in that it oxidizes ethyl alcohol to objectionable intermediate compounds such as aldehydes with subsequent formation of polymerization products. Where water is used for absorption or for the lubrication of the cylinder walls of compressors undesirable introduction of air from the water supply into the $CO_2$ gas results with subsequent introduction of air into the beer.

It is an object of the present invention to provide an apparatus for and method of purifying highly volatile gases wherein it is unnecessary to use chemicals, high temperatures, or solid absorbents, thereby permitting the recovery of impurities such as alcohols, aldehydes, and esters in separate fractions without chemical alteration.

A more specific object of the invention is to provide a method of removing water vapor and other impurities from a highly volatile gas, such as $CO_2$ gas, by condensation of the impurities at temperatures substantially below 32° F., the method providing that condensation take place without formation of ice.

A still further object of the invention is to provide a method as above described wherein the gas to be purified is subjected to treatment by material having a high boiling point and a low freezing point so as to permit low temperature condensation without ice formation.

A more specific object of the invention is to provide a process which is particularly useful in purifying $CO_2$ gas coming from a fermentation process and containing water and alcohol vapors, a fractionating column being used in combination with a condenser. With this arrangement the water and alcohol vapors in the gas are condensed and completely refluxed to the fractionating column so as to provide for enrichment of the alcohol in the condensate near the top of the column. By thus providing enrichment for the alcohol prior to condensation, condensation may take place at very low temperatures without ice formation.

With the above and other objects in view, the invention consists of the improved apparatus for and method of removing impurities from highly volatile gases, and all parts and combinations, as set forth in the claims, and all equivalents thereof.

In the accompanying drawing illustrating one preferred method by which the process of the present invention may be carried out, the figure is a partially diagrammatic view of a system which is particularly suitable for removing impurities from the fermentation gases of a brewing process, certain units being broken away and shown in section.

Referring more particularly to the drawing, the numeral 20 designates a brewery fermenting tank having an outlet pipe 21 for conducting $CO_2$ fermentation gases away from the tank. These gases contain water vapor, alcohol, aldehydes, esters, and some liquid and solid entrainment. The conduit 21 leads to a separator 22 of any standard type, where suspended solids and liquids are deposited. Leading from the separator is a relief line 23 leading to the atmosphere, there being a pressure relief valve 23' which is set to prevent the pressure in the separator 22 and fermenters 20 from rising above a figure of approximately 0.6 p. s. i. g. for safety reasons. The gases leave the fermenting tanks 20 at about 55° F. and are nearly saturated with alcohol and water vapors. Relative to the fermentation liquid, the collection of $CO_2$ for recovery does not customarily begin until the alcoholic content in a given fermenter tank reaches a value of 1%.

From the separator 22 the gas is passed through a line 24 into a blower 25 where it is compressed to a pressure of about 6 p. s. i. g. and it is then passed to a surface heat exchanger 26. Here the gas is cooled by cold water admitted from pipe 27, the supply being controlled by a valve 28 to maintain a suitable temperature difference between the gas and the water. The water leaves the heat exchanger through outlet 29 and then the $CO_2$ gas through pipe 30 at about 80° F.

The $CO_2$ gas then enters the bottom of another heat exchanger 31 where it is cooled to approximately 32° F. by a suitable cooling medium such as ethylene glycol which may enter the heat exchanger through a line 32 and leave through a line 33. The glycol solution may be suitably cooled in a heat exchanger 34 by means of ammonia refrigeration, liquid ammonia entering through pipe line 35 and passing through a throttling valve 36 into the heat exchanger where flash and equilibrium evaporation of the liquid ammonia takes place. The ammonia vapors leave the heat exchanger 34 through line 37 and may be returned to a suitable compressor.

The liquid level in the bottom of the heat exchanger 31 is maintained by an overflow pipe leading to a float controlled chamber 19 having a float which automatically controls a valve 18 to discharge excess liquid. This discharge may go to waste. In case the blower 25 tends to draw off too much gas from the fermenter 20, a return bypass line 17 is provided which leads to the suction side of the blower 25. This return may be automatically controlled through a pressure valve 16 in the line 17 which is so worked out and connected as to make sure that the pressure in the fermenter 20 does not drop below 0.5 p. s. i. g.

The heat exchanger 31 is of the vertical shell and tube type, with the gas flowing upwardly through a single pass which is counter-current to the down-flowing condensate. Thus there is an increase in the alcohol-water vapor ratio in the $CO_2$ gas before it enters the line 38. Baffle plate 15 in the upper portion of the heat exchanger 31 may be provided to precipitate entrainment.

The gases from the heat exchanger 31 pass through pipe line 38 to the bottom of a fractionating column 39, the latter including vertically spaced trays 40, 41, 42, and 43 each having several riser pipes 44. Above each pipe is a bubble cap 45. An overflow pipe 46 is adapted to maintain a desired liquid level above each tray and to direct any overflow to the compartment therebelow.

In the fractionating column 39 the alcoholic content of the liquid on the trays 40—43 is progressively greater toward the top of the column. For example, the liquid on uppermost tray 43 has the greatest alcoholic content, and the alcoholic content of the liquid in the bottom of the column 39 is relatively low. Here the liquid level is maintained at a desired point by an overflow pipe 47 leading to a float controlled chamber 48. A discharge valve 49 may be automatically controlled by the float in the chamber 48 in any well known manner.

The cross-section of the fractionating column 49 and the risers 44 of the trays 40—43 must be sufficient to provide a low velocity of the gas stream so as to minimize entrainment in the outgoing gases.

By the time the gas reaches the outlet pipe 50 leading from the fractionating column, it has become enriched with alcohol. The $CO_2$ gas then enters the horizontal heat exchanger 51 where it is cooled to a temperature substantially below 32° F. and for best results to a temperature of approximately —45° F. The condensate which results is returned as a total reflux through the reflux line 52 back into the solution on top of the uppermost tray 43 of the fractionating column; thus the liquid level on each tray is maintained, any excess liquid overflowing through one of the overflow pipes 46 to the tray therebelow. A sufficient number of trays 40 to 43 is provided to secure enrichment of the alcohol solution which is formed in the condensate in 51 to about 80% to 95% alcohol by weight.

By thus enriching the alcoholic content of the condenate, it is practical to cool the gases to the very low temperature of —45° F. in the heat exchanger 51 without having ice form. In addition, this alcoholic enrichment of the condensate in the fractionating column 39, causes all alcohol-soluble impurities in the $CO_2$ gas, such as aldehydes and esters to be dissolved and removed by the concentrated alcohol in the upper portion of the column. Water-soluble impurities such as acetic and formic acids are dissolved and removed by the dilute aqueous solution at the bottom of the column 39.

While the very low temperature in the heat exchanger 51 may be obtained in any desired manner, the preferred form of the invention illustrated shows a practical method of obtaining this very low temperature by evaporation of liquid carbon dioxide supplied at a pressure and temperature slightly above its triple point, namely slightly above 75 p. s. i. a. (60 p. s. i. g.) and slightly above —70° F. This low temperature permits the cooling of the gas to —45° F. or lower with almost complete condensation of water and alcohol without high compression of the gas. Condensation at low pressures and low temperatures is a desirable feature of this process since this permits removal of impurities without heating or chemical treatment.

The use of a fractionating column and heat exchanger with gas at high pressure is also possible in this process, but placement of the column on the low pressure side is preferable where heat of compression before purification must be avoided. Compression of the gas before purification results in polymerization of the aldehydes present and fouling of the compressors.

In starting an operation, the various trays 40—43 of the fractionating column should be filled with an alcohol-water solution containing more than 50% alcohol by weight. This solution may be admitted from a priming container 53 under control of a hand valve 54. The gas which passes upwardly through the fractionating column 39 and through the various bubble caps 45 does so without much temperature drop until it enters the heat exchanger 51. As before mentioned, heat is preferably extracted from the container 51 by admitting liquid $CO_2$ throttled from a high pressure of about 265 p. s. i. a. to a pressure slightly above 75 p. s. i. a. Evaporation of the liquid $CO_2$ takes place in the container 51 at a temperature not lower than —70° F. The condensate which is actually formed in the container approaches an azeotropic composition having a freezing point of about —100° F. The solution which reaches the bottom of the fractionating column 39 and which is discharged through the valve 49 may be either wasted or if desired, recovered by any desired means.

During the course of condensation of vapors in the container 51 some fog condition may result due to the high temperature gradient between the two fluid media. This fog may be separated from the gas stream by any suitable means such as by use of a trap 55. The entrained liquid is returned to the reflux line 52 by the line 55'. A baffle 56 may also be used at the outlet side of the heat exchanger 51 to separate the fog from the gas stream.

From the trap 55 the pure $CO_2$ gas at a temperature of about —45° F. passes through the line 57 to a first stage compressor 58 where it is compressed to a pressure of about 75 p. s. i. a. From the compressor 58 gas passes through a pipe line 59 into the upper end of a heat exchanger 60 where it is cooled by a cold water supply entering through pipe line 61, under control of a valve 62, and leaving through pipe 63. This cools the gas to a temperature of about 80° F. The gas leaves the heat exchanger 60 through pipe line 64 and passes to a second stage compressor 65. Pipe line 66, which leads from the heat exchanger 51 to the line 64 in advance of the second stage compressor 65, delivers evaporated $CO_2$ gas from the heat exchanger 51 through a throttling valve 67. The valve 67 is preferably controlled automatically by the pressure of the evaporating $CO_2$ liquid in the heat exchanger 51 to keep the pressure in pipe line 66 slightly above 75 p. s. i. a.

The second stage compressor 65 compresses the gas to a pressure of about 265 p. s. i. a. and the gas then passes through a pipe line 68 into a heat exchanger 69 which is cooled by cold water supplied by a pipe line 70 under control of a valve 71. 72 is the outlet line for the cooling water.

It is essential that the compressors 58 and 65 be of a type which requires neither oil nor water for lubrication of the pistons, and of a type where neither oil nor water comes in contact with the $CO_2$ gas. Carbon ring compressors are not satisfactory because of the low humidity. A vertical piston, low clearance type of compressor which uses no oil nor water is suitable.

The gases leave the heat exchanger 69 at a temperature of about 80° F. through pipe line 73 leading to a heat exchanger 74. A bypass line 75 around the two compressors 58 and 65 leads from the pipe line 73 to the pipe line 57. A valve 76 in this line may be suitably controlled so that if the pressure in line 24' tends to fall below about 6 p. s. i. g. then the bypass valve 76 is opened automatically by a suitable pressure controller which may be hooked up with the line 24.

The heat exchanger 74 is preferably cooled by liquid ammonia entering through the line 77 and leaving by the line 78, and throttled through valve 79 in the line 77. Inasmuch as a small amount of condensate may form in the heat exchanger 74, this may collect in the bottom and be discharged through an overflow pipe 80 into a float controlled chamber 81 from which the overflow is discharged to waste through a pipe 82 under control of a valve 83, the latter being automatically operated by the float in the chamber 81. This may be either discharged to waste or if desired returned to the top tray 43 of the fractionating column 39.

Gas leaving the heat exchanger 74 is conducted by pipe line 84 to a container 85 which may be cooled by flash and equilibrium evaporation of liquid ammonia entering through line 86 under control of a throttle valve 87 leaving through line 88. The liquid ammonia establishes a temperature of about $-8°$ F. in the container 85. $CO_2$ gas is completely condensed in the condenser 85 and is passed through the line 89 to a storage tank 90.

For use as gas, the liquid $CO_2$ passes from the storage tank 90 through pipe line 91 and throttle valve 92 to an evaporator 93 where heat is supplied through ammonia gas coming from a pipe line 94. Ammonia vapor condenses in evaporator 93 and the condensate may be returned by a pump 95 through a pipe line 96. The $CO_2$ gas leaves evaporator 93 through a pipe line 97 leading to a modulator 98 where the gas is superheated to about $60°$ F. by cold water supplied through a pipe line 99. The throttle valve 92 may be suitably controlled by the pressure in the line 100 by the use of any suitable arrangement.

As before mentioned, it is preferred to use $CO_2$ in the heat exchanger 51 to create the very low temperature therein. For this purpose $CO_2$ liquid from the storage tank 90 at about 265 p. s. i. a. is passed through a pipe line 101 leading to the heat exchanger 51, and is throttled at valve 102 at a pressure of slightly over 75 p. s. i. a., evaporation taking place in the heat exchanger 51 where heat is supplied to it by the stream of low pressure gas coming from the fractionating column 39. Throttle valve 102 is preferably controlled by the liquid level in the heat exchanger 51 through the use of any suitable float controlled valve.

The system just described is the one which it is preferred to use in the purification of fermenter gases in a brewery. It is, however, to be understood that simpler forms of the system illustrated are contemplated, the essence of the invention centering around the function of the units 39 and 51 and their connections. It is further to be understood that for certain types of use it is practical to employ in the trays 40—43 instead of alcohol, other compounds having a low freezing point in aqueous solution and which are highly soluble in water and which will appear only as small unobjectionable traces in the final product such as acetone, propylalcohol, and triethylamine. The method of the present invention may also be used for condensing water vapor from other sources of $CO_2$, not containing alcohol, by the addition of alcohol to the fractionating column.

Where a system of the general type illustrated is employed, it is also possible to use only one of the compressors 58 or 65, although use of both low and high stage compressors is preferred.

With respect to the line 66 which leads the $CO_2$ gas from the heat exchanger 51 back into the system, it is to be understood that while this is economical in the arrangement illustrated, it is not essential and the line 66 may go to any other low pressure use. It is also to be understood that the units 39 and 51 may be in a position following the compressor 65 rather than in the position illustrated, but the system illustrated is necessary where heat of compression before purification must be avoided. Compression of the gas before purification results in polymerization of the aldehydes and fouling of the compressors. In addition, condensation at low pressures and at low temperatures, as illustrated and described, is a desirable feature since it permits removal of impurities without heating or chemical treatment.

The present invention permits the purification of gases without the use of water, without use of chemicals such as potassium permanganate, without the use of solid adsorbents such as silica gel, activated carbon or alumina.

The present system permits the identification and study of the separate components of fermentation gases and therefore makes it possible to obtain better control of the fermentation process in a brewery.

With the present process, the various impurities of fermenter gases, such as alcohols, aldehydes, and esters may be recovered in a nearly pure state unaltered by any chemical reaction induced either by high temperatures or by treatment with chemicals or solid adsorbents. With the present process there is no introduction of air into the $CO_2$ as is ordinarily done when air-saturated water is used for absorption of impurities and for lubrication of compressor cylinder walls.

Other changes, modifications, and adaptations, in addition to those heretofore mentioned, may be employed without departing from the spirit of the invention, and all of such changes and adaptations are contemplated as may come within the scope of the claims.

What we claim is:

1. A method of purifying a highly volatile gas of a type that normally boils below $-100°$ F. containing water vapor and vapors of an anti-freeze compound of a type which has a freezing point substantially lower than that of water when in aqueous solution, comprising enriching the content of the anti-freeze compound in the gas, and thereafter cooling said gas to a temperature substantially lower than $32°$ F., condensing the water vapors and anti-freeze vapors in said gas while utilizing the original anti-freeze content of the said gas as enriched to permit low temperature condensation while preventing freezing of the condensate with resulting ice formation, continuously refluxing substantially all of said condensate to the gas for use in enriching the anti-freeze compound therein, and withdrawing the cooled uncondensed dry gas.

2. A method of purifying highly volatile gas of a type that normally boils below $-100°$ F., containing water vapor and vapor of an anti-freeze compound which has a freezing point substantially lower than that of water when in aqueous solution, comprising passing the gas upwardly through a fractionating zone containing a solution of said anti-freeze compound to cause enrichment of the content of the anti-freeze compound in the gas, thereafter cooling said gas to a temperature substantially lower than $32°$ F., condensing the water and anti-freeze vapors in said gas while utilizing the original anti-freeze content of the said gas as enriched to permit low temperature condensation while preventing freezing of the condensate with resulting ice formation, continuously returning substantially all of said condensate to the fractionating zone for use therein, and withdrawing the cooled uncondensed dry gas.

3. A method of purifying $CO_2$ gas containing water and alcohol vapor comprising passing the gas upwardly through a fractionating zone containing alcohol solution to cause enrichment of the alcoholic content of said gas, thereafter cooling said enriched gas to a temperature substantially lower than $32°$ F., condensing the water and alcohol vapors while utilizing the original alcoholic content of the $CO_2$ gas as enriched to permit low temperature condensation while preventing freezing of the condensate with resulting ice formation, continuously returning substantially all of said condensate to the fractionating zone for use therein and withdrawing the cooled uncondensed dry gas.

4. In a method of removing impurities including water and alcohol from evolved fermentation gases in a brewery prior to the reintroduction of said gases into the beer, the steps of collecting the fermentation gases together with their water and alcohol vapors, passing the collected gas upwardly through a fractionating zone having superimposed pools which contain alcohol in solution to thereby enrich the alcoholic content of the condensible portion of the fermentation gases, discharging said gases from the fractionating zone, thereafter cooling said gases to a low temperature substantially lower than 32° F. and condensing an aqueous condensate including a high percentage of alcohol while maintaining said cooling temperature above the freezing point of the condensate to prevent ice formation, and continuously refluxing substantially all of said condensate to an upper pool of the fractionating zone, thereby automatically maintaining the alcoholic content in the fractionating zone, removing the gas from the process in dry form, reducing said dried gas to a liquid state and storing in said state, returning said stored liquid to a gaseous state, and reintroducing the latter into the beer.

5. A method of protecting a gas cooler from freezing when said cooler is used in a process of removing impurities including water from a highly volatile gas which has water and volatile anti-freeze therein, the steps of first passing the entire stream of said gas upwardly through a fractionating zone having intercommunicating superimposed pools each containing the same volatile anti-freeze to thereby enrich the anti-freeze content of the condensible portion in the gas, thereafter cooling the gas to a temperature substantially below 32° F. while condensing the aqueous solution of anti-freeze without ice formation, continuously refluxing substantially all of the condensed anti-freeze from the gas cooler back to an upper pool of the fractionating zone thereby automatically maintaining a high anti-freeze content, removing the gas from the cooler in dry form, and discharging water and other impurities from the bottom of said fractionating zone.

6. A method of protecting a gas cooler from freezing when said cooler is used in a process of removing impurities including water from a highly volatile gas which has water therein the steps of first passing the entire stream of said gas upwardly through a fractionating zone having intercommunicating superimposed pools each containing an aqueous alcohol solution to thereby enrich the alcohol content of the condensible portion of the gas, thereafter cooling the gas to a temperature substantially below 32° F. while condensing the aqueous solution of alcohol, continuously refluxing substantially all of the condensate from the gas cooler back to an upper pool of the fractionating zone thereby automatically maintaining the alcohol content, and discharging water and other impurities from the bottom of said fractionating zone.

7. An apparatus for separating impurities including water from a highly volatile gas which comprises, a fractionating column having superimposed intercommunicating trays, means for maintaining pools of an anti-freeze liquid which is more volatile than water and less volatile than the gas to be dried in said trays, a cooler having a capability of condensing the vapors of said anti-freeze, means for introducing low temperature refrigerant to said cooler, means for withdrawing the vapors of said refrigerant, means for introducing the entire stream of a gas having a sensible heat sufficient to reboil the bottom of the column into a lower portion of said fractionating column, means for conducting vapors from the top of the fractionating column to the cooler, means for continuously returning substantially all of the liquid condensibles from the cooler to an upper tray of the fractionating column, means for conducting dry purified gas away from the cooler, and means for withdrawing condensed moisture and other impurities from the bottom of the fractionating column.

8. The process of removing moisture from a highly volatile gas of a type that normally boils below minus 100° F. containing alcohol, moisture, and other impurities comprising maintaining a pool of liquid alcohol in fixed position, passing all of the gas through said pool to enrich the alcohol content of the gas, thereafter cooling the gas to a temperature substantially lower than 32° F., condensing the alcoholic vapors, water vapors, and other impurities, utilizing the original alcohol content of the gas as enriched to permit low temperature condensation while preventing freezing of the condensate with resulting ice formation, continuously automatically refluxing substantially all of said condensate to the pool, and withdrawing the cooled uncondensed dry gas.

9. The process of removing moisture from a highly volatile gas of a type that normally boils below minus 100° F. containing alcohol, moisture, and other impurities comprising maintaining superimposed pools of liquid alcohol in fixed position, passing all of the gas upwardly through said pools to enrich the alcohol content of the gas, thereafter cooling the gas to a temperature substantially lower than 32° F., condensing the alcohol vapors, water vapors, and other impurities, utilizing the original alcohol content of the gas as enriched to permit low temperature condensation while preventing freezing of the condensate with resulting ice formation, continuously automatically refluxing substantially all of said condensate to an upper pool, and withdrawing the cooled uncondensed dry gas.

10. The process of removing moisture from a highly volatile gas of a type that normally boils below minus 100° F. containing water vapor and vapors of an anti-freeze comprising maintaining a pool of liquid anti-freeze in fixed position, passing all of the gas through said pool to enrich the anti-freeze content of the gas, thereafter cooling the gas to a temperature substantially lower than 32° F., condensing the anti-freeze vapors and water vapors, utilizing the original anti-freeze content of the gas as enriched to permit low temperature condensation while preventing freezing of the condensate with resulting ice formation, continuously automatically refluxing substantially all of said condensate to the pool, and withdrawing the cooled uncondensed dry gas.

References Cited in the file of this patent

UNITED STATES PATENTS

| 1,868,755 | Mount | July 26, 1932 |
| 2,113,588 | Greenewalt | Apr. 12, 1938 |
| 2,327,643 | Houghland | Aug. 24, 1943 |
| 2,417,279 | Van Nuys | Mar. 11, 1947 |
| 2,645,104 | Kniel | July 14, 1953 |
| 2,663,154 | Craig | Dec. 22, 1953 |
| 2,666,019 | Winn | Jan. 12, 1954 |

FOREIGN PATENTS

| 591,095 | France | June 27, 1925 |